Dec. 13, 1949 M. H. ROWE 2,491,282
APPARATUS FOR MAKING PATCHES
Filed Oct. 2, 1948 3 Sheets-Sheet 1
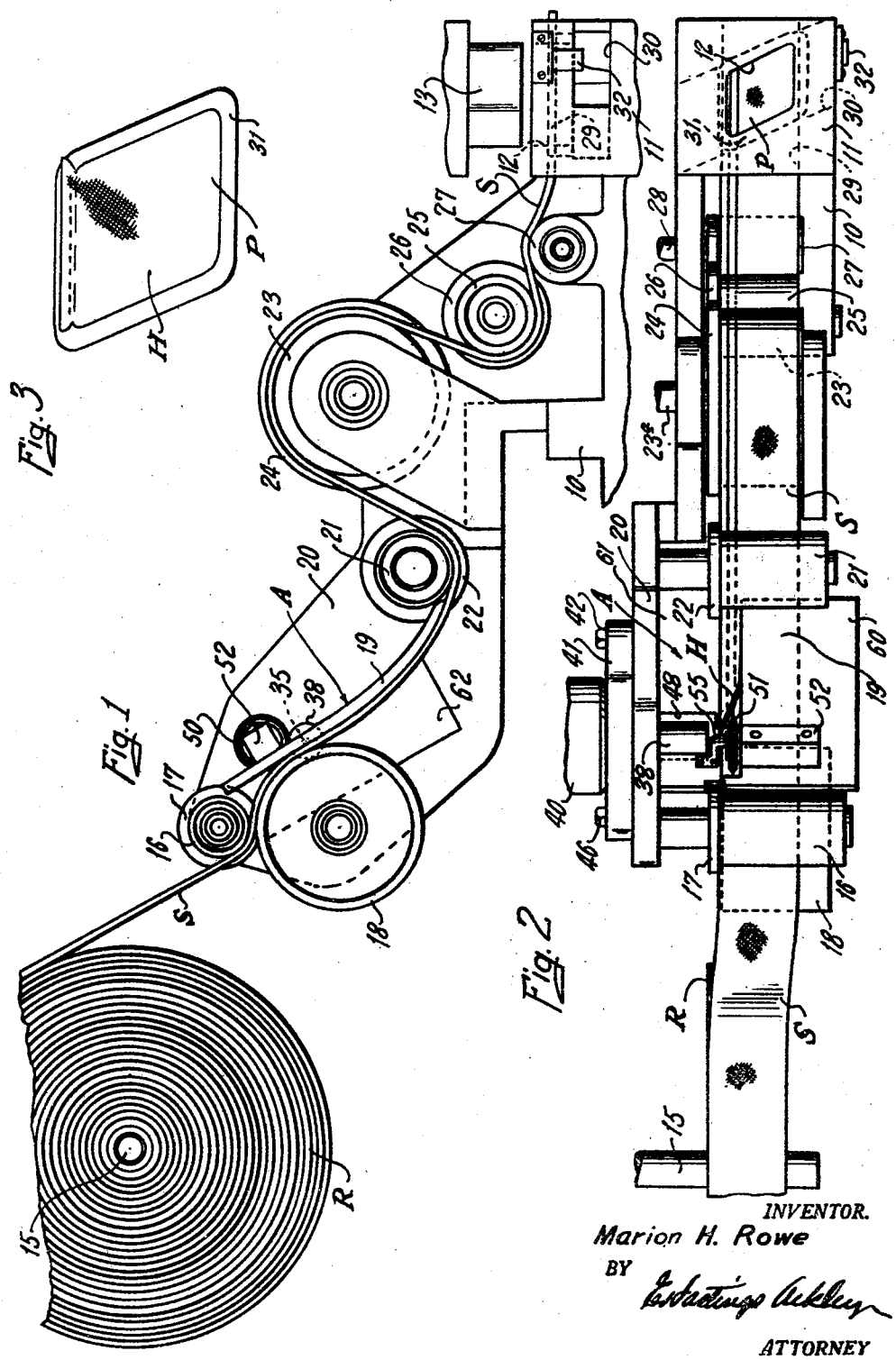
INVENTOR.
Marion H. Rowe
BY
ATTORNEY

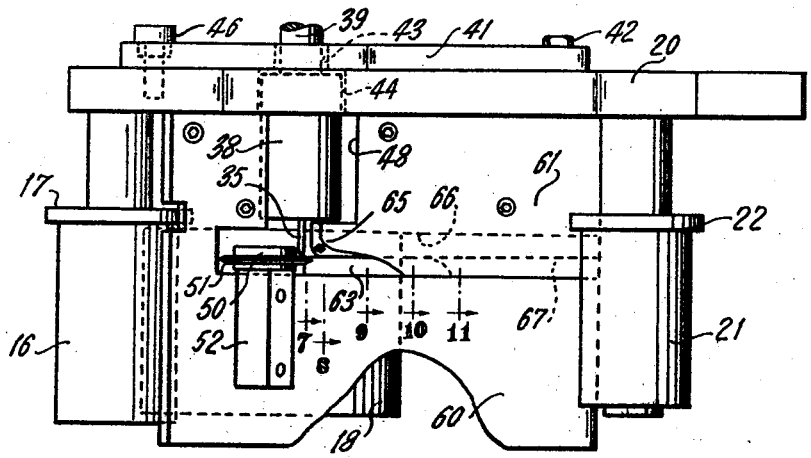
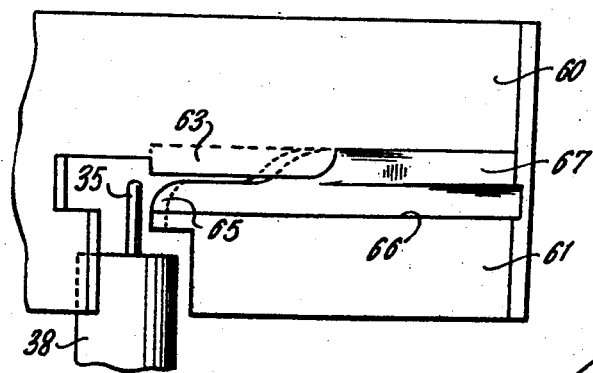
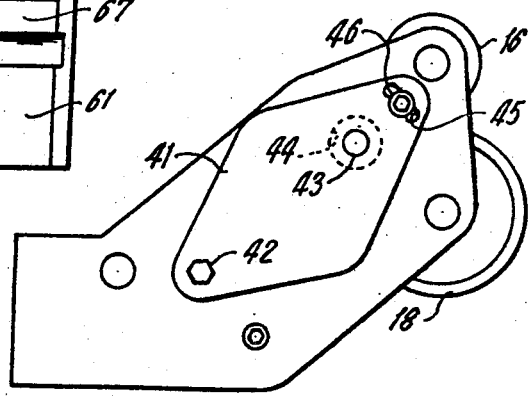
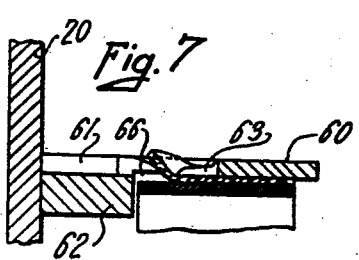
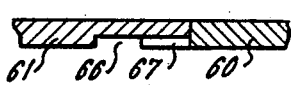
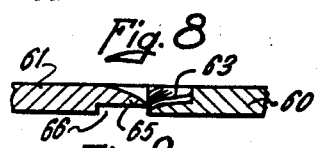

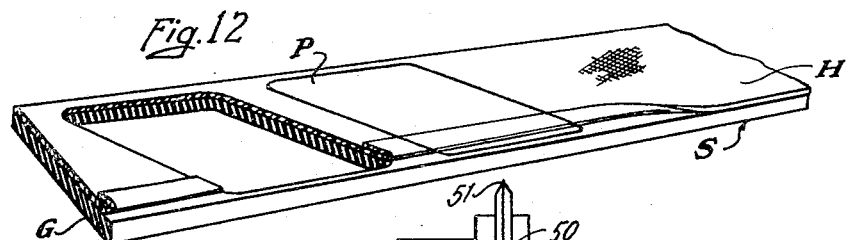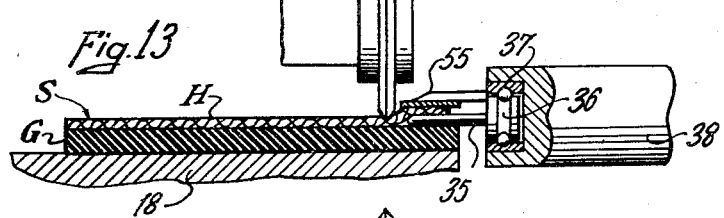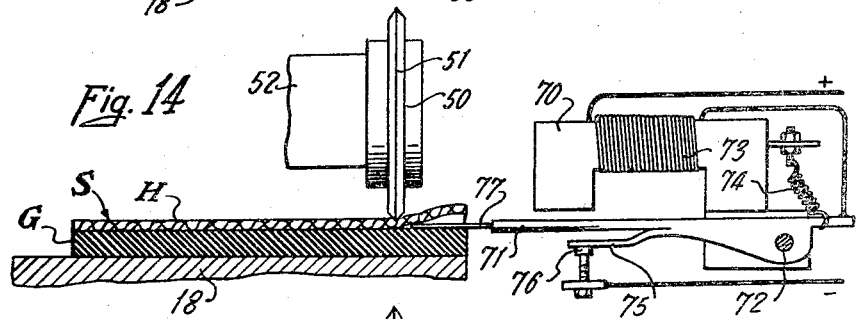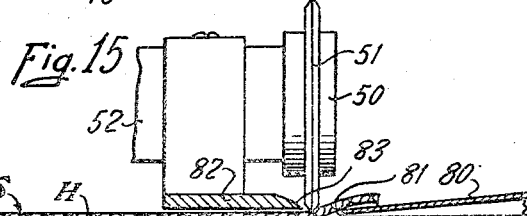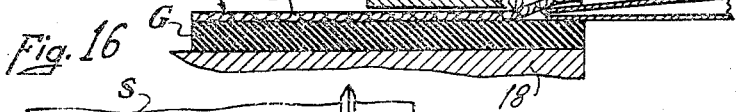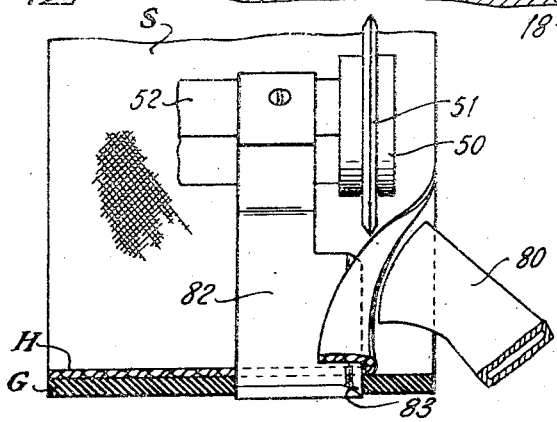
Marion H. Rowe
INVENTOR.

Patented Dec. 13, 1949

2,491,282

UNITED STATES PATENT OFFICE 2,491,282

APPARATUS FOR MAKING PATCHES

Marion H. Rowe, Dallas, Tex.

Application October 2, 1948, Serial No. 52,469

18 Claims. (Cl. 154—1.8)

This invention relates to new and useful improvements in apparatus for making patches of uncured rubber or the like, and more particularly to the apparatus used in forming a patch of uncured rubber with a protective covering of fabric or the like which can be readily grasped and pulled away from the rubber.

It has been a common practice for many years to repair punctures, ruptures or breaks in inner tubes or other rubber articles by affixing a patch of rubber or the like to the article to completely cover and close the break, rupture or puncture. One of the more common means for accomplishing this result consists of individual self-contained vulcanizing units having a combination pressure plate and fuel container with a fuel element therein and a patch of vulcanizable gum rubber or other similar material attached or adhering to the underside of the pressure plate. The vulcanizable gum rubber or other material commonly has a protective covering, usually of treated fabric such as Holland cloth or similar material, which is pressed upon and tightly adheres to the exposed surface of the gum material and which prevents contamination and deterioration of the exposed surface of such vulcanizable gum material. Another means for repairing the puncture or break in the rubber tube or other article is a patch known as a cold patch and comprising a partially cured rubber backing and uncured rubber facing which is adapted to be applied to the tube or other article to adhere thereto to completely cover and close the break or puncture. The uncured rubber of this latter patch is likewise provided with a protective covering, usually of treated fabric such as Holland cloth or similar material, which is pressed upon and tightly adheres to the exposed surface of the uncured rubber of the patch to protect the same against contamination and deterioration.

The protective coverings of these patch members have heretofore been cut to the same size, shape and dimensions as the body of vulcanizable rubber or partially cured or vulcanized rubber having the uncured rubber on the face, and have therefore been difficult to remove when the patch is to be used. It has been necessary to insert some object between the protective covering and the vulcanizable patch material or the uncured gum rubber face of the patch to initially free an edge of the protective covering so that such covering may be stripped from the patch material, to provide for exposure of the uncured rubber or vulcanizable material so that the same may be applied directly upon the article to be repaired to adhere thereto. In the absence of some means for starting the freeing or lifting of the protective covering, it has been extremely difficult to remove the protective covering to uncover the vulcanizable or uncured rubber material without damaging the same.

A grasping portion or tab may be provided on the protective covering material to provide means for grasping and lifting the covering material to facilitate the stripping of the fabric cover from the rubber of the patch preparatory to applying the same to an article to be repaired. Vulcanizing patches having incorporated therein the lifting tabs providing for grasping and lifting the protective covering to strip the same from the patch, together with methods of making the same, have been illustrated in my co-pending application for United States Letters Patent, Serial No. 732,190, filed March 4, 1947, and entitled Vulcanizing patches and methods of making the same.

The present invention pertains more particularly to the apparatus used for initially separating the Holland protective covering material from the vulcanizable or uncured rubber of the patch material and infolding the lifted or separated portion of the Holland fabric, whereby a patch shape may be cut from a strip of vulcanizable rubber having the protective Holland fabric covering on one surface thereof to provide a lifting tab for the Holland fabric to facilitate removal thereof from the vulcanizable or uncured rubber.

It is, therefore, one object of this invention to provide an improved apparatus for forming rubber or like patches having a protective covering adhering to an uncured surface thereof and provided with a tab or grasping portion to facilitate removal of such protective covering from the vulcanizable or uncured material of the patch.

An important object of the invention is to provide apparatus for separating or freeing a marginal portion of the protective covering material from a body of patch material of rubber or the like having the covering material adhering to one surface thereof.

It is a particular object of the invention to provide apparatus of the character described which is constructed and arranged to continuously lift and infold a marginal edge portion of the protective covering fabric of an elongate strip of vulcanizable rubber having the protective covering adhering to one surface thereof, whereby the rubber patches may be cut from said strip to provide the protective covering with a lifting tab or grasping portion.

Another object of the invention is to provide an apparatus having means therein for positively separating a marginal portion of the protective Holland fabric from a strip of uncured rubber patch material, in combination with means arranged to infold the lifted or separated marginal edge portion of the Holland fabric to overlie the portion of the fabric remaining adhered to the uncured rubber adjacent the fold, and means for maintaining such infolded marginal portion of the protective covering fabric in such folded position until a patch shape has been cut from the strip of uncured rubber and Holland fabric with the fold edge of the protective covering Holland fabric within the patch shape so cut out, whereupon the infolded portion of the fabric in the patch shape may be unfolded to completely recover the exposed surface of the uncured rubber and provide a grasping portion or lifting tab on the protective fabric.

It is a particularly important object of the invention to provide an apparatus of the character described which is adapted for use in automatic machines, whereby the patch having the lifting tab on the protective covering may be produced in great quantities and without additional material cost.

Additional objects and advantages of the invention will readily be apparent from the reading of the following description of a device constructed in accordance with the invention, and reference to the accompanying drawings thereof, wherein:

Figure 1 is a side elevation of an apparatus, constructed in accordance with the invention, for forming patches having lifting tabs, Figure 2 is a plan view of the apparatus of Figure 1, Figure 3 is a plan view of a vulcanizing element having a patch formed in accordance with the invention forming a part thereof, Figure 4 is an enlarged plan view of the lifting and folding mechanism of the apparatus of Figure 1.

Figure 5 is a rear side elevation of the lifting and folding mechanism of Figure 4, Figure 6 is an underside view of the lifting and folding mechanism, Figures 7, 8, 9, 10 and 11 are fragmentary transverse vertical sectional views taken on the section lines 7, 8, 9, 10 and 11 of Figure 4, showing the folding course through the folding mechanism, Figure 12 is an enlarged isometric view of a strip of patch material having a marginal portion of its protective covering lifted and infolded in accordance with the invention, Figure 13 is a schematic view illustrating the manner in which a marginal edge portion of the protected covering is lifted or freed from the strip of patch material, Figure 14 is a view, similar to Figure 13, illustrating a modified form of means for lifting or freeing a marginal portion of the protective covering from a strip of patch material, Figure 15 is a view similar to Figure 13 showing still another means for freeing a marginal portion of the covering material from the strip of patch material, and Figure 16 is an isometric view of the device of Figure 15 further showing the manner of lifting or freeing a marginal portion of the protective covering and infolding the same.

In the drawings, the numeral 10 designates a frame of a machine for making patches. Mounted on the frame is a die 11 having an aperture 12 therein through which a punch 13 reciprocates to cut patch shapes from an elongate strip S of vulcanizable gum rubber G or the like having a protective covering H, preferably of treated fabric such as Holland cloth or the like, adhering to one surface thereof. The elongate strip of patch material is preferably formed in a roll R which is mounted on a spindle 15 carried by the frame of the machine and spaced from the die and punch.

The strip of patch material S is withdrawn from the roll R with the Holland cloth H uppermost, and is directed first beneath a guide roller 16 having an inner guide flange 17 formed thereon for correctly aligning the strip for travel through the machine. From the guide roller, the strip of patch material passes through a lifting and folding apparatus A which frees and infolds a marginal edge portion of the Holland cloth of the strip. In the lifting and folding apparatus, the strip is fed onto a pressure roller 18 with the exposed surface of the rubber engaging the roller, and from the pressure roller the strip passes along the underside of an arcuate folder shoe 19 with the Holland cloth engaging the shoe. Both the pressure roller and the folder shoe are carried by a frame plate 20 which is secured to the machine frame 10. From the lifting and folding apparatus the strip passes under a second guide and pressure roller 21 having an inner guide flange 22 formed thereon, and then over a large drive or feeding roller 23 mounted on a drive shaft 23a and having a guide flange 24 at its inner end for driving and guiding the strip in its passage through the machine. From the feeding roller, the strip passes under a third guide roller 25 also having a guide flange 26 on its inner end for guiding the exposed lower surface of the rubber of the strip in proper alignment onto a stripping and supplemental drive roller 27 mounted on a drive shaft 28 carried by the frame of the machine. The frictional engagement or adherence of the exposed rubber to the stripping roller permits said stripping roller to feed the strip into a longitudinal passageway 29 formed in the die for receiving and guiding the strip therethrough beneath the aperture 12, whereby the punch 13 may cut the desired patch shapes from the strip in the die. The severed patch shape is pressed downwardly in the aperture 12 to a lateral outlet opening 30 formed transversely of the die, whereby the patch shape may be ejected from the die after it has been cut from the strip.

In the apparatus illustrated, a vulcanizing unit pan 31, having a fuel element (not shown) secured therein, may be disposed in the opening 30 with the bottom of the pan uppermost for receiving the patch shape formed from the strip by the die punch, and the vulcanizing unit may then be ejected laterally from the opening 30 in the die into a suitable container or to other operating parts of the machine. However, in the formation of cold patches, wherein the backing of the rubber of the strip is cured and therefore not adhesive or tacky, the patch shapes cut by the die and punch may be ejected directly from the opening 30 as the shapes are cut from the strip, and the ejected cut out patch shapes may then be suitably disposed for storage or other handling. It is preferable, in either case, that a wiping finger 32 be carried adjacent the outlet of the opening 30 for unfolding the infolded edge portion of the Holland cloth in the patch shape to completely re-cover the exposed unvulcanized or uncured surface of the patch shape in the manner shown in Figure 3. The wiping finger will normally engage the Holland cloth as the patch shape is ejected from the lateral opening 30 of the die.

For separating and initially lifting the Holland protective covering fabric from the body of gum rubber, the lifting and folding apparatus A is provided with an elongate cylindrical finger or spindle 35 which has one end secured within the inner race 36 of a ball bearing 37 which is secured in the end of a housing 38 carried by the shaft 39 of an electric motor 40 or other source of power. The motor is secured to a swingable mounting arm 41 which is pivoted at one end on a bolt 42 carried by the frame plate 20, and the shaft extends through an opening 43 in the arm and a larger opening 44 in the frame plate whereby the spindle 35 is disposed to engage the inner marginal portion of the strip S of vulcanizing material. At its other end, the swingable arm is provided with an arcuate slot 45 through which a clamping bolt 46 threads into the frame plate 20, said slot providing for adjustment in position of the spindle and the bolt 46 providing for locking the swingable arm in the adjusted positions.

As clearly shown in Figures 2, 4 and 13, the housing 38 and spindle 35 extend outwardly in an opening 48 in the folder shoe 19 adjacent the pressure roller 18 and the outer end of the spindle 35 overlies the inner edge portion of the pressure roller 18 a distance substantially equal to the width of the infolded marginal portion of the Holland cloth of the strip of vulcanizing material. The spindle is preferably spaced from the cylindrical surface of the pressure roller a distance substantially equal to the thickness of the rubber G of the strip of vulcanizing material, or with its lower side substantially tangent to the plane of juncture of the rubber and Holland cover, as clearly shown in Figure 13, whereby the spindle will readily enter between the gum rubber and the Holland cloth to separate the Holland from the rubber along the marginal edge of the strip. With the spindle so disposed with respect to the plane of juncture of the Holland cloth with the upper surface of the gum rubber, it will be seen that the rubber will pass beneath the spindle and that the Holland cloth will pass above the spindle. Thus, the marginal edge portion of the Holland cloth is separated from the gum rubber and may be lifted and folded inwardly over the portion of the Holland adhering to the rubber adjacent the line of separation or the fold edge.

Due to the fact that the spindle 35 is freely rotatable with respect to the housing 38 because of the ball bearing 37 which supports the spindle, it will be seen that the spindle will ride along the upper surface of the strip of rubber G and will turn with the rubber as the rubber is fed through the machine. The Holland cloth has a low coefficient of friction, and will readily slide along the upper surface of the spindle. The electric motor also turns the housing 38 in the same direction in which the spindle 35 revolves due to its frictional engagement with the rubber, such rotative movement of the housing tending to reduce the frictional resistance to rotation of the spindle since the outer race of the bearing is constantly rotating in the direction of rotation which the spindle 35 undergoes when the strip of rubber is moved through the machine. However, due to the provision of the ball bearing 37, it will readily be seen that the spindle 35 may remain stationary when the rubber strip is not moving through the machine even though the housing be turned by the motor.

While the electric motor or the like has been described as positively turning the housing 38 in which the bearing 37 carrying the spindle 35 is mounted, and such construction is preferable, it is believed obvious that the housing 38 may be secured in a stationary position on the swingable arm 41 and that the bearing 37 will nevertheless permit the spindle 35 to rotate as the rubber is moved. Of course, the housing and spindle must be adjustable toward and away from the peripheral surface of the pressure roller 18 to permit correct positioning of the spindle with respect to the roller to accommodate different conditions and thicknesses of the rubber of the vulcanizing strip. In such case, the swingable arm 41 would be adjustable and the housing 38 carried thereby would be moved toward and away from the surface of the pressure roller in the same manner as if the housing were carried by the motor shaft rather than being secured to the adjustable arm.

In order to establish a more definite line of demarcation between the lifted or freed marginal edge portion of the Holland material and the remaining body of Holland adhering to the gum rubber, a contact roller 50, having an annular flange with its outer edges beveled inwardly to form a converging substantially linear contact surface 51, is mounted on a support 52 which is secured to the upper surface of the folder shoe 19 in such a manner that the contact edge 51 presses against the upper surface of the Holland at a point spaced inwardly slightly from the outer rounded end of the spindle 35. The contact roller presses the Holland toward the uncured rubber to increase the adherence of the Holland to the rubber at that point and to form a definite line of demarcation of the lifted or freed Holland edge portion to facilitate infolding of the freed marginal edge portion of the Holland over the remainder of the body of Holland adhering to the gum rubber.

The contact roller also serves another purpose, as will now be explained. In starting the strip S through the machine, it would be preferable that the spindle 35 be so positioned that its axis is spaced from the pressure roller 18 a distance slightly less than the thickness of the rubber portion of the strip, or slightly below the line of juncture of the Holland and rubber, whereby the marginal edge of the rubber of the strip would be compressed as it entered the space between the spindle and the pressure roller, and the Holland could not readily enter therebetween. This would assure initiating separation of the Holland from the rubber. However, in use, after the spindle has been started between the Holland and the rubber, it would be preferable that the spindle be positioned so as to be substantially tangent to the upper surface of the rubber to reduce or eliminate deformation of the rubber as the strip moves past the spindle. The provision of the contact roller permits obtaining substantially the benefits of both positions without requiring adjustment of the spindle from the preferable starting position to the preferable running position, due to the fact that the pressure of the contact roller acting downwardly upon the upper surface of the strip S causes the marginal edge portion of the strip to lift slightly. Such lifting of the marginal edge of the strip S causes the line of juncture between the Holland and rubber to be moved upwardly with respect to the axis of the spindle as the entering edges thereof start between the spindle and the pressure roller, so that the aforementioned preferable starting conditions are obtained. Once the spindle has entered between the Holland and rubber, however, the lifting of the marginal edge portion of the strip is not so pronounced, and the benefits of the running position are obtained. However, while the use of the contact roller 50 is preferable, it is not essential and may be omitted, since the spindle may be started between the Holland and rubber by hand or otherwise and since the Holland is freed from the rubber along a rather definite line by the outer rounded end of the spindle.

In order to prevent the body of rubber along the marginal edge of the strip S from tending to creep over the upper portion of the spindle 35 with the Holland cloth, a foot member or shoe 55 may be mounted on the upper surface of the folder shoe 19 so as to extend rearwardly above the spindle 35, the lower surface of the shoe being spaced from the spindle a distance substantially equal to the thickness of the Holland cloth. It will be seen, therefore, that the shoe 55 precludes anything but the Holland cloth from passing over the upper surface of the spindle, whereby the gum rubber will be positively directed beneath the spindle and a positive separation of the Holland and gum rubber assured. Of course, the shoe 55 may also be omitted if desired, since the rubber of the strip only tends to creep over the spindle when the strip has remained stationary for a considerable period of time or when the spindle is positioned too close to the pressure roller 18.

After the marginal edge portion of the Holland has been freed or separated from the gum rubber of the strip S in the manner just described, the freed portion of the Holland may be infolded to overlie the main body thereof in any suitable manner, and the folder shoe 19 illustrated has incorporated therein one suitable form of folding mechanism or means. The folder shoe is formed of two sections, an outer section 60 and a separate inner section 61. The outer section is substantially L-shaped and has the short arm or lateral portion thereof secured by means of bolts to a block 62 carried by the frame plate 20, and its elongate longitudinal portion spaced outwardly from and extending parallel to said frame plate. The upper surface of the inner edge portion of the longitudinal portion of the outer section is relieved or cut away to provide a fold restraining shoe 63, over which the freed marginal edge portion of the Holland may be infolded, as clearly shown in Figures 4 and 6 through 11. The restraining shoe terminates substantially centrally of the longitudinal portion of the outer section, whereby the infolded marginal edge portion of the Holland may pass off of such restraining shoe and into juxtaposition with the remaining body of the Holland adhering to the upper surface of the rubber G of the strip.

The inner section 61 of the folder shoe is likewise secured by means of bolts to the block 62 and extends outwardly from the frame plate 20 to lie adjacent the inner edge of the longitudinal portion of the outer section 60. The inner section is provided with a forwardly projecting finger 65 near its outer edge, said finger being spaced slightly outwardly beyond the outer end of the housing 38 carrying the spindle 35, and projecting forwardly from such inner section 61 to a point closely adjacent the spindle 35, whereby the Holland material separated from the rubber may pass over the projecting finger and the rubber may pass beneath said projecting finger. An elongate groove 66 is formed in the under surface of the inner section and is so disposed and of such dimensions that the marginal edge portion of the rubber exposed by lifting and folding the Holland does not contact the underside of the folder shoe. The forward end of the finger is beveled to facilitate entry of the finger beneath the Holland and above the rubber, and the outer edge portion of the forward end of the finger is likewise beveled downwardly and outwardly, whereby the freed edge portion of the Holland is lifted along the beveled surface and gradually turn inwardly over the restraining shoe 63 of the outer section of the folder shoe. The plane of the bevel on the finger gradually becomes upright near the main body of the inner section 61 and then is turned outwardly by an outward projection of the inner section disposed slightly above the rearward portion of the restraining shoe 63, as clearly illustrated in Figures 4 and 6 through 11, whereby the marginal edge portion of the Holland is completely infolded above the portion of the Holland adhering to the rubber adjacent the fold. The inner section 61 is provided with a downwardly projecting smoothing or pressure foot 67, in longitudinal alignment with and spaced slightly rearwardly of the rear end of the fold restraining shoe 63 of the outer section, for pressing the infolded portion of the Holland securely against the main body thereof and creasing the fold of the Holland to assure that the infolded portion thereof will remain folded until subsequent operations have been performed on the strip and it is desired to unfold the same. It is believed manifest that other folding means than the form just described may be used for infolding the freed marginal edge portion of the Holland; for example, a series of rollers successively engaging and turning such freed edge portion of the Holland.

From the folder shoe, the strip of vulcanizing material passes under the second guide and pressure roller 21 which further presses the infolded portion of the Holland against the main body thereof and restrains the same in such folded position. The strip with the infolded marginal edge portion of the Holland protective material then passes the drive or feeding roller 23 and guide roller 25 and is moved by the stripping roller 27 through the opening 29 into the die 11 wherein the patch shape T is cut from the strip.

It will be noted that the patch shape is cut from the strip within the longitudinal edges thereof so that the edge of the patch is spaced inwardly from the edge of the rubber of the strip and the fold edge of the Holland is disposed slightly within the marginal edge of the patch shape, whereby the infolded marginal edge portion of the Holland of the patch shape, which is wider than the exposed upper surface of the rubber of said patch, may be unfolded to recover the upper surface of the rubber material of the patch and project beyond the edge of such rubber material to provide a lifting tab or grasping portion on the protective covering or Holland cloth.

The uncut marginal edge portions of the strip provide means for pulling the scrap or waste portions of the strip from within the die. Any suitable means may be used to engage and pull such waste portions from the die.

From the foregoing, it will be seen that an apparatus has been provided for making patches having grasping portions or lifting tabs formed on the protective covering therefor; said apparatus including means for positively freeing or separating a marginal edge portion of the protective covering from the strip of vulcanizable material having the protective covering adhering to one surface thereof and then infolding the separated marginal edge portion of the protective covering whereby a patch shape may be cut from the strip with the fold edge of the infolded portion within the edges of the patch shape so that the infolded portion may be subsequently unfolded to recover the exposed surface of the rubber of the patch material and project beyond the edge of such rubber to provide the lifting tab or grasping portion for lifting the protective covering from the patch material when it is desired to use the same.

It will particularly be noted that the apparatus hereinbefore described is especially suitable for use in high speed automatic machines wherein an elongate strip of patch material having a protective covering adhering thereto is fed through the machine, and wherein the apparatus will continuously and automatically separate, lift and infold the marginal edge portion of the protective covering of the patch material for the purposes described.

Another means for separating the marginal edge portion of the protective covering H from the rubber G of the strip of patch material is illustrated in Figure 14, wherein an electro-magnetic vibrator or buzzer 70 having a vibrating or reciprocating arm 71 pivotally secured thereto on a pin 72 is actuated by means of an electro-magnet 73 and a spring 74. The swingable or vibrating arm 71 is normally biased away from the electro-magnet by the spring 74, whereby a contact arm 75 carried by said arm engages an electrical contact point 76 to establish an electrical circuit through the electro-magnet 73, whereupon the magnet draws the swingable arm upwardly toward the magnet and lifts the contact arm from the contact point to break the electrical circuit. The spring 74 then returns the swingable arm to the position shown in the drawings, and the process is repeated.

For separating the Holland from the rubber to the strip, an elongate reed 77 is secured to the outer end of the reciprocating or vibrating arm and overlies the marginal edge portion of the strip of patch material. The reed is so disposed with respect to the pressure roller 18 of the lifting and folding apparatus that it lies in the plane of juncture of the Holland cloth with the rubber and vibrates slightly thereabove. It will be seen that the rapid vibration of the reed caused by the vibrator 70 will cause the reed to lift the marginal edge portion of the Holland away from the rubber when the vibrating arm 71 is lifted by the electro-magnet. Due to the high frequency of vibration of the arm and the reed carried thereby, the reed will not contact the adhesive or uncured face of the rubber of the strip for any substantial length of time, and will therefore not undergo any substantial lateral movement. However, the reed may be formed of a slightly resilient material to permit such slight lateral displacement of the reed as would be caused by the engagement of the reed with the rubber.

The contact roller 50 may be provided for assuring a definite line of demarcation between the freed marginal edge portion of the Holland the remainder of the Holland adhering to the rubber.

The vibrator mechanism 70 may be secured to the swingable arm 41, and the vibrating arm 71 and reed 77 may project through the frame plate 20 in the same manner as the bearing housing 38 and spindle 35 of the form first described. Such mounting will permit adjustment of the position of the reed with respect to the pressure roller 18 and the plane of juncture of the Holland with the rubber of the strip S passing through the machine.

The freed marginal edge portion of the Holland may be infolded in any suitable manner, as by the means already described as being incorporated in the folder shoe 19.

It is also believed manifest that the reed 77 may be flat and have a substantial width, and that the arm carrying the reed may be oscillated upon its longitudinal axis, whereby the reed is actuated or oscillated about its longitudinal axis to alternately lift and lower the opposite side edges of the flat reed to free the Holland from the rubber of the patch material.

While an electro-magnetic vibrator or buzzer of a specific type has been illustrated as the means for causing vibration of the reed, it is believed to be obvious that the reed may be vibrated mechanically, or by an air-operated mechanism, or by an uninterrupted high frequency alternating current vibrator, or in any other suitable manner.

A still further means for freeing and separating the marginal edge portion of the Holland, and for then infolding such freed edge portion, is illustrated in Figures 15 and 16. In this form of the invention a gaseous jet, such as a jet of compressed air or the like, is ejected from a nozzle 80 having a long narrow substantially line-like orifice outlet 81 formed therein, whereby a thin substantially flat jet of gas is emitted from the nozzle and directed between the Holland H and rubber G of the strip S of patch material for blowing the marginal edge portion of the Holland free of engagement with the rubber. The jet is preferably directed between the Holland and rubber at an angle opposing the motion of the strip through the machine, as clearly shown in Figure 16.

The outlet end of the nozzle may be flared to direct a lateral jet of gas at the marginal edge portion of the Holland so freed from the rubber by the jet, so that such freed edge portion will be blown inwardly over a folding shoe 82 secured to the support 52 of the contact roller 50 and disposed to ride along the upper surface of the Holland cloth with a longitudinal folding edge 83 in substantial alignment with the contact edge 51 of the contact roller. Thus, the blast of air from the flared nozzle will blow the freed marginal edge portion of the Holland to cause the same to fold along the longitudinal edge of the shoe and overlie the remainder of the Holland adhering to the rubber adjacent the fold.

Manifestly, the jet nozzle 80 may be secured to the swingable arm 41 of the lifting and folding apparatus previously described, instead of the bearing housing 38 and the spindle 35 or the vibrator 70. However, the nozzle need not be so mounted but may be carried by the frame 10 of the machine and be otherwise adjustable with respect to the pressure roller 18, whereby the jet of gas or air ejected from the nozzle may be properly directed between the Holland and rubber of the strip of patch material to free the marginal edge portion thereof.

Furthermore, instead of folding the freed marginal edge portion of the Holland by means of the air blast, it is obvious that the folder mechanism incorporated in the folder shoe 19 of the form first described may be utilized to infold the freed marginal portion of the Holland. It has been found that the pressure of the gas ejected from the nozzle orifice should preferably be not less than 40 pounds per square inch. However, under some circumstances the pressure required may be slightly lower or considerably higher, as for example 100 pounds per square inch, due to the variation in adherence of the Holland with the uncured surface of the rubber of the patch material.

It will be seen that each of the modified forms of the means for initially freeing and lifting the marginal edge portion of the protective covering from the body of rubber of the patch material strip S provides for positively freeing and lifting such marginal edge portion and then infolding the freed marginal edge portion to overlie the protective covering adhering to the rubber adjacent the fold, whereby a patch shape may be cut from the strip with the fold edge of the protective covering within the edges of the patch shape so that the infolded portion may be subsequently unfolded to recover the exposed uncured surface of the rubber of the patch material and project beyond the edge of such rubber to provide a lifting tab or grasping portion for lifting the protective covering from the patch material when it is desired to use the same. It will also be seen that each of the modified forms is likewise suitable for use in high speed automatic machinery for continuously infolding the same for the purposes described.

It is believed manifest that the strip S of patch material may be supported adjacent the separating mechanism by means other than the pressure roller 18. For example, the strip may be supported by the roll R of patch material itself, in which case the roll of patch material would serve the same purpose as the pressure roller. Of course, the roll R or the spindle 35 would have to be progressively adjusted toward each other to compensate the reducing diameter of the roll as successive layers of patch material were unwound from the roll, and this could be accomplished by cam means, or in any other suitable manner. Also, a continuous conveyor belt or the like might be substituted for the pressure roller 18, if desired.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A patch making machine for making patches from a strip of patch material having a protective covering adhering to one surface thereof and including, means for separating a marginal edge portion of the protective covering from the patch material of the strip, means for infolding the separated portion of the protective covering to overlie the portion of such covering adhering to the strip of patch material adjacent the fold, and means for cutting a patch shape from the patch material and covering with the fold within the patch shape.

2. A patch making machine for making patches from an elongate strip of patch material having a protective covering adhering to one surface thereof and including, a frame, support means for the strip of patch material, means carried by the frame for feeding the strip of patch material and protective covering, a separating and folding apparatus for separating a marginal edge portion of the protective covering and infolding the same to overlie the portion of such covering adhering to the patch material adjacent the fold, and means for cutting a patch shape from the patch material and covering with the fold within the patch shape.

3. In a patch making machine for making patches from an elongate strip of patch material having a protective covering adhering to one surface thereof, a lifting and folding apparatus including, a frame, means carried by said frame for separating a marginal edge portion of the protective covering from the strip of patch material, movable supporting means carried by the frame for supporting the strip of patch material adjacent the separating means, and means for infolding the separated marginal edge portion of the protective covering to overlie the portion of such covering adjacent the fold.

4. An apparatus for separating and folding a marginal edge portion of the protective covering for an elongate strip of patch material having an uncured surface and a protective covering adhering to said uncured surface and including, a support member, a rotatable pressure roller carried by said support member and adapted to have the strip of patch material pass longitudinally thereover, separating means carried by the support and disposed adjacent the pressure roller for separating a marginal edge portion of the protective covering from the uncured surface of the patch material, and means carried by said support for infolding said separated marginal edge portion of the protective covering material to overlie the portion of such covering material adhering to the uncured material of the patch adjacent the fold.

5. An apparatus for separating a marginal edge portion of a protective covering adhering to an uncured surface of an elongate strip of patch material and including, a support, a pressure roller rotatably carried by the support, and a rotatable spindle carried by the support and spaced from the peripheral surface of the pressure roller, said spindle being arranged to be interposed between the protective covering and the uncured surface of the strip of patch material to separate the marginal edge portion of said protective covering from the strip of patch material as the strip is moved therepast.

6. In a device of the character set forth in claim 5, means for adjustably positioning the spindle parallel to the peripheral surface of the pressure roller and spaced therefrom a distance sufficient to permit the strip of patch material to pass between the spindle and the pressure roller surface but close enough to preclude the passage of the protective covering therebetween.

7. In an apparatus of the character set forth in claim 5, means carried by the support spaced from the spindle on the opposite side of said spindle from the pressure roller for preventing the patch material from passing over the spindle.

8. In a patch making machine for making patches from an elongate strip of patch material having an uncured surface and a protective covering material adhering to said uncured surface, means for separating a marginal edge portion of the protective covering material from the uncured surface of the patch material and including, a frame, a movable support member carried by said frame and arranged to have the strip of patch material pass thereover, movable separating means carried by said frame and disposed with respect to the support member so as to be positioned to enter between the protective covering material and the uncured surface of the patch material to separate the covering material from the patch material, and means for moving the strip of patch material past said support member and separating means.

9. A device of the character set forth in claim 8, wherein the movable means for separating the covering material from the patch material includes an elongate cylindrical spindle freely rotatable upon its longitudinal axis and adjustably carried by the frame.

10. A device of the character set forth in claim 8, wherein the movable means for separating the covering material from the patch material includes an elongate cylindrical spindle rotatably mounted at one end in a housing so as to be freely rotatable about its longitudinal axis, and means for rotating the housing in a direction reducing the frictional resistance to rotation of the spindle as the same contacts the patch material.

11. A device of the character set forth in claim 8 including, a folder carried by the frame and disposed to receive and infold the separated marginal edge portion of the covering material to overlie the portion of such material adjacent the fold.

12. A device of the character set forth in claim 8, wherein the movable means for separating the covering material from the patch material includes a vibrating member which is vibrated at a speed sufficient to cause the member to separate the marginal edge portion of the protective material from the patch material.

13. In a patch making machine for making patches from an elongate strip of patch material having an uncured surface and a protective covering material adhering to said uncured surface, means for separating a marginal edge portion of the protective covering material from the uncured surface of the patch material and including, a frame, a movable support member carried by said frame and arranged to have the strip of patch material pass thereover, a gaseous jet directed between the protective covering material and the strip of patch material for separating the marginal edge portion of the protective covering material from engagement with the uncured surface of the patch material, and means for moving the strip of patch material past the support member and separating jet.

14. A device of the character set forth in claim 13, wherein the gaseous jet directed between the protective covering material and the body of patch material to separate the covering material from the patch material and lift the same also is arranged to infold the separated marginal edge portion of the protective covering material to overlie the portion of such covering material adhering to the patch material adjacent the fold.

15. A device of the character set forth in claim 13, wherein the gaseous jet directed between the protective covering material and the strip of patch material to separate the covering material from the patch material and lift the same likewise is arranged to blow the separated marginal edge portion of the protective covering material inwardly to overlie the portion of the protective covering material adhering to the patch material adjacent the fold, and a restraining shoe is provided for limiting the inward movement of the protective covering material to define the position of the fold edge.

16. An apparatus for separating and folding a marginal edge portion of the protective covering for an elongate strip of patch material having an uncured surface and a protective covering adhering to said uncured surface and including, a support member, a rotatable pressure roller carried by said support member and adapted to have the strip of patch material pass longitudinally thereover, separating means adjustably carried by the support and disposed adjacent the pressure roller for separating a marginal edge portion of the protective covering from the uncured surface of the patch material, and means carried by said support for infolding said separated marginal edge portion of the protective covering material to overlie the portion of such covering material adhering to the uncured material of the patch adjacent the fold.

17. In a patch making machine for making patches from an elongate strip of patch material having an uncured surface and a protective covering adhering to said uncured surface, means for forming a projecting grasping tab on the protective covering material at a marginal edge of the patch shape and including, a frame, a movable support member carried by said frame and arranged to have the strip of patch material pass thereover, an elongate spindle rotatably supported at one end by a housing so as to be freely rotatable about its longitudinal axis, means for adjustably mounting the housing on the frame to dispose the spindle adjacent the movable support member so as to be movable toward and from said support member, the spindle being adapted to enter between the protective covering material and the uncured surface of the patch material to separate a marginal edge portion of the covering material from the patch material, a folder carried by the frame and disposed to receive and infold the separated marginal edge portion of the covering material to overlie the portion of such material adjacent the fold, drive means for moving the strip of patch material past the support member and spindle and the folder, and means for cutting a patch shape from the patch material and covering material with the fold within and adjacent a marginal edge of the patch shape.

18. In a patch making machine for making patches from an elongate strip of patch material having an uncured surface and a protective covering adhering to said uncured surface, means for forming a projecting grasping tab at a marginal edge of the patch shape and including, a frame, a cylindrical supporting roller rotatably carried by the frame and arranged to have the strip of patch material pass thereover with the protective covering outermost, an elongate spindle rotatably supported at one end by a housing so as to be freely rotatable about its longitudinal axis, means for adjustably mounting the spindle supporting housing on the frame to dispose the spindle adjacent and substantially parallel to the cylindrical surface of the supporting roller and so as to be movable toward and from the supporting roller, the spindle being adapted to enter between the protective covering material and the uncured surface of the patch material to separate a marginal edge portion of the covering material from the patch material, the patch material passing between the spindle and the surface of the supporting roller, a folder carried by the frame and disposed to receive and infold the separated marginal edge portion of the covering material to overlie the portion of such material adjacent the fold, a drive roller carried by the frame and engageable with the strip of patch material for moving said strip past the supporting roller and spindle and the folder, a cutting die for cutting a patch shape from the strip of patch material and folded covering material with the fold within and adjacent a marginal edge of the patch shape, and means for unfolding the infolded marginal edge portion of the covering material of the patch shape.

MARION H. ROWE.

REFERENCES CITED

The following references are of record in the file of this patent:

UNITED STATES PATENTS

| Number | Name | Date |
|---|---|---|
| 1,612,267 | Dickson | Dec. 28, 1926 |
| 2,233,209 | Herzog | Feb. 25, 1941 |
| 2,373,092 | Avery | Apr. 10, 1945 |
| 2,419,809 | Avery | Apr. 29, 1947 |

FOREIGN PATENTS

| Number | Country | Date |
|---|---|---|
| 634,317 | France | Nov. 18, 1927 |
| 679,341 | France | Jan. 6, 1930 |